US012126092B1

(12) United States Patent
Thai et al.

(10) Patent No.: US 12,126,092 B1
(45) Date of Patent: Oct. 22, 2024

(54) ANTENNA AND PCB LAYOUT TOPOLOGY DESIGNS FOR FREQUENCY SCALABILITY IN PCB TECHNOLOGY FOR ANTENNA ARRAYS

(71) Applicant: Anokiwave, Inc., San Diego, CA (US)

(72) Inventors: Trang Thai, San Diego, CA (US); Jason L. Durbin, San Diego, CA (US); Vipul Jain, Irvine, CA (US); Michael Coolen, San Diego, CA (US)

(73) Assignee: Anokiwave, Inc., San Diego, CA (US)

( * ) Notice: Subject to any disclaimer, the term of this patent is extended or adjusted under 35 U.S.C. 154(b) by 0 days.

(21) Appl. No.: 18/239,383

(22) Filed: Aug. 29, 2023

Related U.S. Application Data

(63) Continuation of application No. 17/716,359, filed on Apr. 8, 2022, now Pat. No. 11,749,889.

(60) Provisional application No. 63/173,116, filed on Apr. 9, 2021.

(51) Int. Cl.
*H01Q 1/38* (2006.01)
*H01Q 1/22* (2006.01)
*H01Q 3/34* (2006.01)
*H01Q 21/06* (2006.01)
*H01Q 21/24* (2006.01)

(52) U.S. Cl.
CPC ............. *H01Q 3/34* (2013.01); *H01Q 1/2283* (2013.01); *H01Q 21/06* (2013.01); *H01Q 21/245* (2013.01)

(58) Field of Classification Search
CPC .......... H01Q 1/38; H01Q 1/22; H01Q 1/2283; H01Q 3/34; H01Q 21/06; H01Q 21/24; H01Q 21/245
See application file for complete search history.

(56) References Cited

U.S. PATENT DOCUMENTS

| | | | | |
|---|---|---|---|---|
| 5,162,803 A * | 11/1992 | Chen | H01Q 13/085 342/372 |
| 11,749,889 B1 * | 9/2023 | Thai | H01Q 21/24 343/702 |
| 11,955,722 B1 * | 4/2024 | Thai | H01Q 21/065 |

* cited by examiner

*Primary Examiner* — Tho G Phan
(74) *Attorney, Agent, or Firm* — Nutter McClennen & Fish LLP

(57) ABSTRACT

A phased array system has a substrate, a plurality of elements, and a plurality of beamforming ICs. Each beamforming IC has a first set of element interfaces and a second set of element interfaces. The first set of element interfaces may be configured to be polarized in a first polarization, while the second set of element interfaces may be configured to be polarized in a second (different) polarization. Each beamforming IC has a first common interface electrically coupled with its first set of element interfaces and, in a corresponding manner, each beamforming IC also has a second common interface electrically coupled with its second set of element interfaces. The system further has an interconnect element (e.g., a circuit trace, metallization on a PCB, etc.) electrically coupling the first common interface with the second common interface of another beamforming IC.

20 Claims, 7 Drawing Sheets

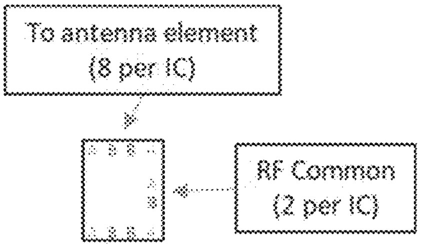
*Figure 4: Simple IC Showing Commons and Antenna Outputs*
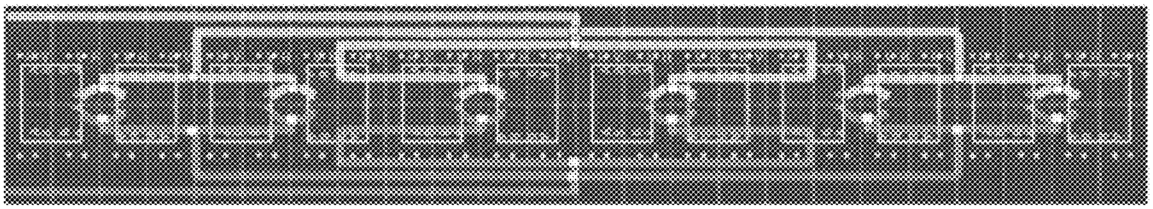
*Figure 5: PCB Routing of Multiple ICs Through Rotational Symmetry*

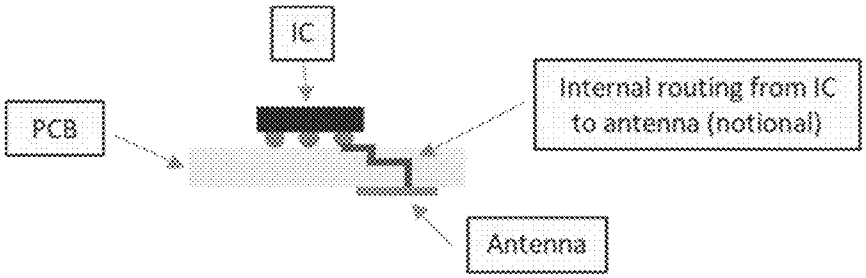
*Figure 6: Side View of Typical Antenna Routing from IC Through PCB*
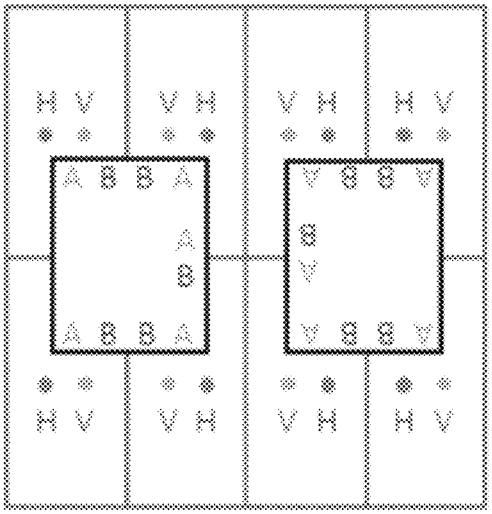
*Figure 7: Zoomed in View Showing Rotation of Odd Numbered ICs with Antenna Polarization Mirror Symmetry*

*Figure 8: Internal PCB Antenna Routing from IC*

ANTENNA AND PCB LAYOUT TOPOLOGY DESIGNS FOR FREQUENCY SCALABILITY IN PCB TECHNOLOGY FOR ANTENNA ARRAYS

CROSS-REFERENCE TO RELATED APPLICATION(S)

This patent application is a continuation of Ser. No. 17/716,359 entitled ANTENNA AND PCB LAYOUT TOPOLOGY DESIGNS FOR FREQUENCY SCALABILITY IN PCB TECHNOLOGY FOR ANTENNA ARRAYS filed Apr. 8, 2022 (U.S. Pat. No. 11,749,889 issued Sep. 5, 2023), which claims the benefit of U.S. Provisional Patent Application No. 63/173,116 entitled ANTENNA AND PCB LAYOUT TOPOLOGY DESIGNS FOR FREQUENCY SCALABILITY IN PCB TECHNOLOGY FOR ANTENNA ARRAYS filed Apr. 9, 2021, which is hereby incorporated herein by reference in its entirety.

FIELD OF THE INVENTION

Illustrative embodiments generally relate to phased array systems and, more particularly, various embodiments relate to layout of certain phased array systems.

BACKGROUND OF THE INVENTION

Antennas that emit electronically steered beams are known in the art as "phased array antennas." Such antennas are used worldwide in a wide variety of commercial applications. They typically are produced from many small radiating elements that are individually phase controlled to form a beam in the far field of the antenna.

Among other things, phased array antennas are popular due to their ability to rapidly steer beams without requiring moving parts.

SUMMARY OF VARIOUS EMBODIMENTS

In accordance with one embodiment of the invention, a phased array system has a substrate, a plurality of elements, and a plurality of beamforming ICs. Each beamforming IC has a first set of element interfaces and a second set of element interfaces. The first set of element interfaces may be configured to be polarized in a first polarization, while the second set of element interfaces may be configured to be polarized in a second (different) polarization. Each beamforming IC has a first common interface electrically coupled with its first set of element interfaces and, in a corresponding manner, each beamforming IC also has a second common interface electrically coupled with its second set of element interfaces. The system further has an interconnect element (e.g., a circuit trace, metallization on a PCB, etc.) electrically coupling the first common interface with the second common interface of another beamforming IC.

Among other things, interconnect element may electrically couple adjacent beamforming ICs. Moreover, the first polarization may be a horizontal polarization and the second polarization may be a vertical polarization. To simplify the design, the plurality of beamforming ICs may have the same interface layouts.

In one example, the plurality of beamforming ICs includes a right beamforming IC and a left beamforming IC. Using the identification indicia noted below, the left beamforming IC has an A-B-B-A configuration with H-V-V-A, while the right beamforming IC has an A-B-B-A configuration with a V-H-H-A configuration. In addition, the left beamforming IC has its first common interface being an A interface while, in a similar manner, the right beamforming IC has its second common interface as a B interface. The interconnect element preferably electrically connecting the right beamforming IC second common interface with the left beamforming IC first common interface in a manner that does not produce a physical crossover with another interface coupling with another common interface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Those skilled in the art should more fully appreciate advantages of various embodiments of the invention from the following "Description of Illustrative Embodiments," discussed with reference to the drawings summarized immediately below.

FIG. 4 schematically shows a simple beamforming IC with common and antenna/element outputs in accordance with illustrative embodiments of the invention.

FIG. 5 schematically shows a printed circuit board rouging of multiple beamforming ICs through a rotational symmetry in accordance with illustrative embodiments of the invention.

FIG. 6 schematically shows a side view of antenna/element routing from a beamforming IC through a PCB to an antenna/element on the opposite side of the PCB in accordance with illustrative embodiments of the invention.

FIG. 7 schematically shows a zoomed-in view of the above figures showing effective rotation of odd numbered beamforming ICs with antenna polarization mirror symmetry in accordance with illustrative embodiments of the invention.

FIG. 8 schematically shows an internal PCB antenna routing from beamforming ICs in accordance with illustrative embodiments of the invention.

DESCRIPTION OF ILLUSTRATIVE EMBODIMENTS

Figure 1:
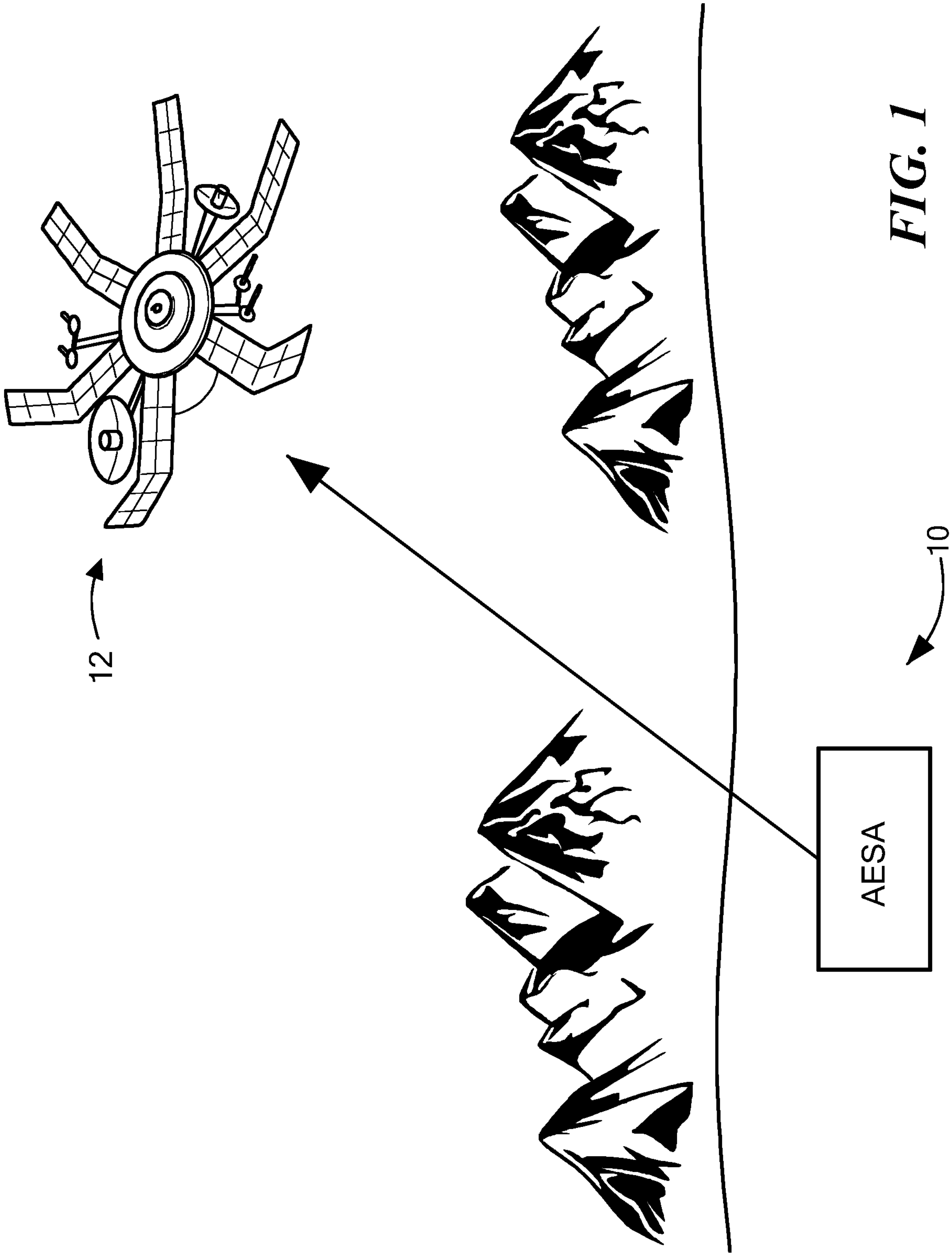
FIG. 1 schematically shows an active electronically steered element system ("AESA system") configured in accordance with illustrative embodiments of the invention and communicating with a satellite.

FIG. 1 schematically shows an active electronically steered antenna system ("AESA system 10") configured in accordance with illustrative embodiments of the invention and communicating with an orbiting satellite 12. A phased array (discussed below and identified by reference number "10A") implements the primary functionality of the AESA system 10. Specifically, as known by those skilled in the art, the phased array forms one or more of a plurality of electronically steerable beams that can be used for a wide variety of applications. As a satellite communication system, for example, the AESA system 10 preferably is configured to operate at one or more satellite frequencies. Among others, those frequencies may include the Ka-band, Ku-band, and/or X-band.

The satellite communication system may be part of a cellular network operating under a known cellular protocol, such as the 3G, 4G, or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 (implementing the noted phased array 10A) in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

Figure 2A:
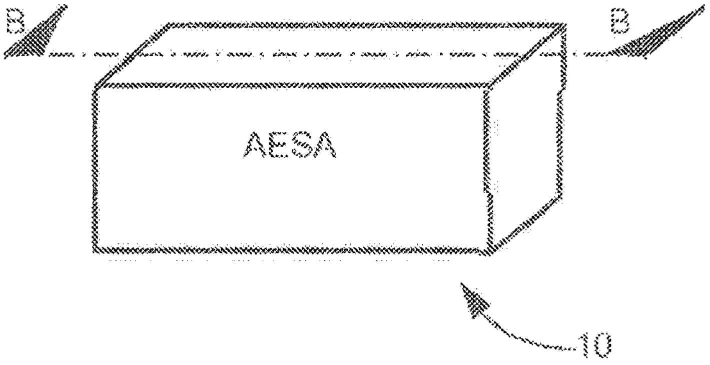
FIGS. 2A and 2B schematically show generalized diagrams of an AESA system that may be configured in accordance with illustrative embodiments of the invention.
Figure 2B:
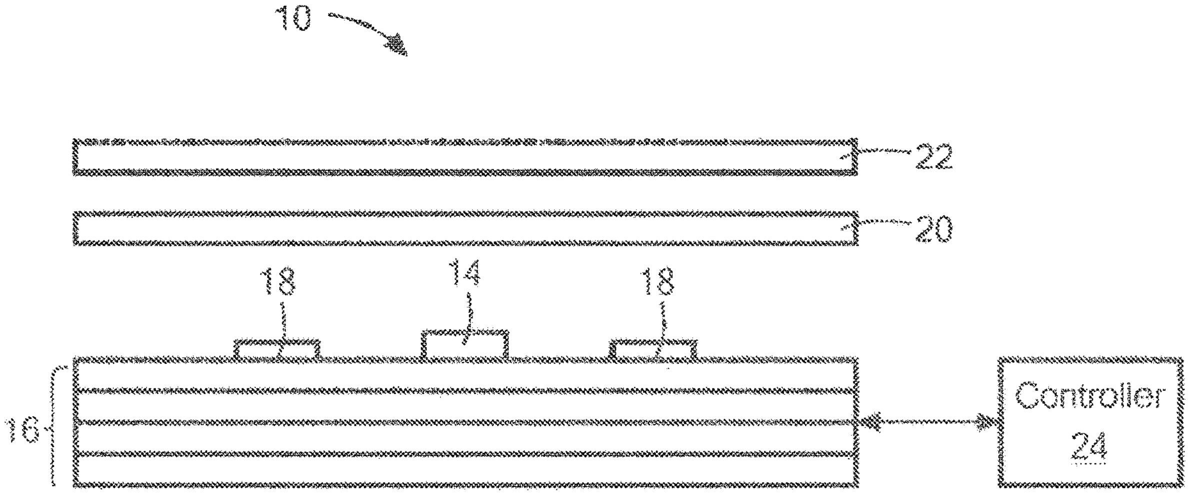

FIGS. 2A and 2B schematically show generalized diagrams of the AESA system 10 configured in accordance with illustrative embodiments of the invention. Specifically, FIG. 2A schematically shows a block diagram of the AESA system 10, while FIG. 2B schematically shows a cross-sectional view of a small portion of the same AESA system 10 across line B-B. This latter view shows a single silicon integrated circuit 14 mounted onto a substrate 16 between two transmit, receive, and/or dual transmit/receive elements 18, i.e., on the same side of a supporting substrate 16 and juxtaposed with the two elements 18. Note that in some embodiments, such as some implementing cellular communications, the integrated circuit 14 can be coupled with four elements 18. In alternative embodiments, however, the integrated circuit 14 could be on the other side/surface of the substrate 16A. The AESA system 10 also has a radome 22 to environmentally protect the phased array of the system 10. A separate antenna controller 24 (FIG. 2B) electrically connects with the phased array to calculate beam steering vectors for the overall phased array, and to provide other control functions.

Figure 3A:
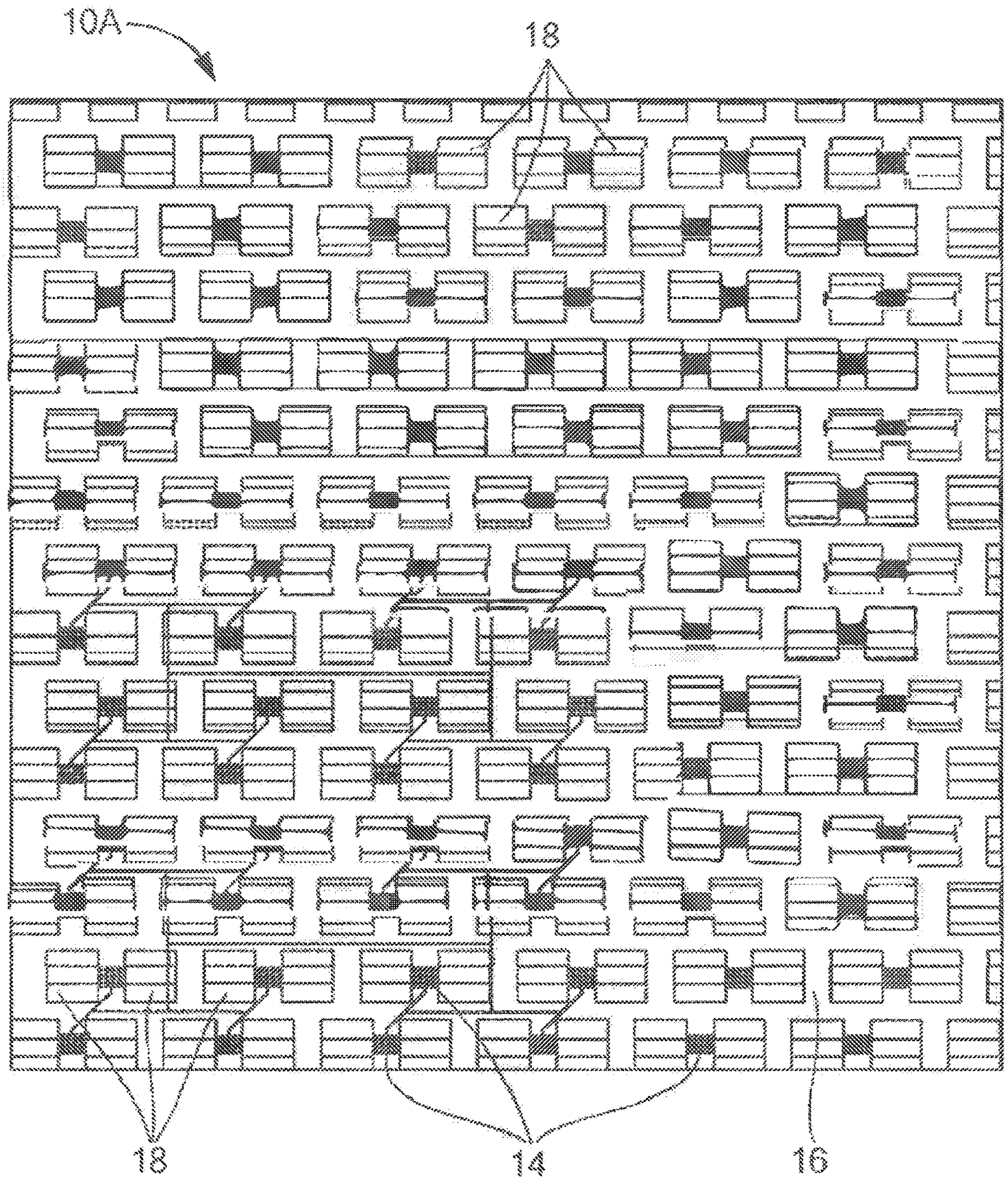
FIG. 3A schematically shows a plan view of a laminar printed circuit board portion of an AESA configured in accordance with illustrative embodiments of the invention.

FIG. 3A schematically shows a plan view of a primary portion of an AESA system 10 that may be configured in accordance with illustrative embodiments of the invention. In a similar manner, FIG. 3B schematically shows a close-up of a portion of the phased array 10A of FIG. 3A.

Specifically, the AESA system 10 of FIG. 3A is implemented as a laminar phased array 10A having a laminated printed circuit board 16 (i.e., acting as the substrate for routing signals and also identified by reference number "16") supporting the above noted plurality of elements 18 and integrated circuits 14. The elements 18 preferably are formed as a plurality of square or rectangular patch antennas oriented in a triangular patch array configuration. In other words, each element 18 forms a triangle with two other adjacent elements 18. When compared to a rectangular lattice configuration, this triangular lattice configuration requires fewer elements 18 (e.g., about 15 percent fewer in some implementations) for a given grating lobe free scan volume. Other embodiments, however, may use other lattice configurations, such as a pentagonal configuration or a hexagonal configuration. Moreover, despite requiring more elements 18, some embodiments may use a rectangular lattice configuration. Like other similar phased arrays, the printed circuit board 16 also may have a ground plane (not shown) that electrically and magnetically cooperates with the elements 18 to facilitate operation.

Figure 3B:
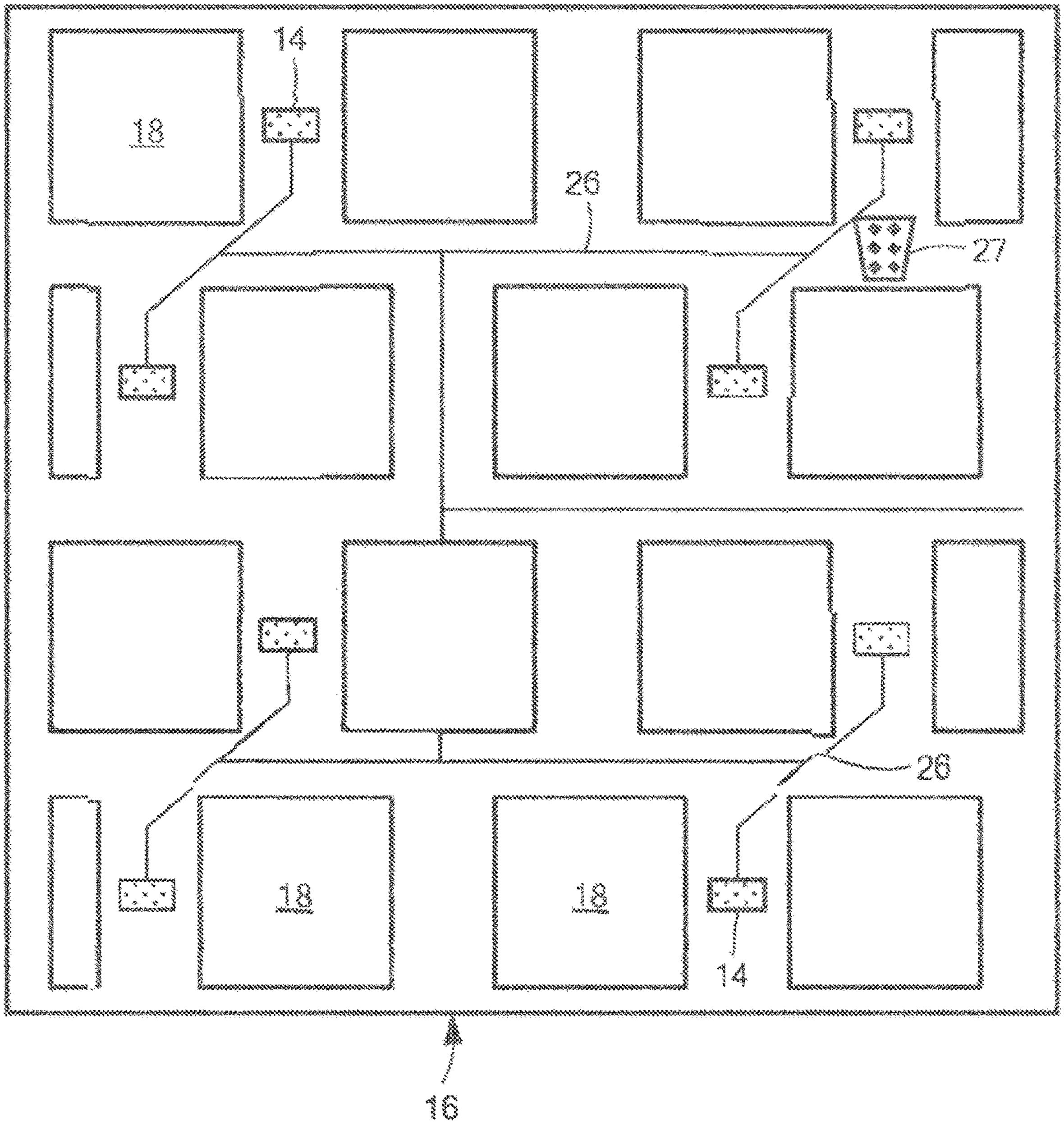
FIG. 3B schematically shows a close-up of a portion of the laminated printed circuit board of FIG. 3A.

Indeed, the array shown in FIGS. 3A and 3B is a small phased array 10A. Those skilled in the art can apply principles of illustrative embodiments to laminar phased arrays 10A with hundreds, or even thousands of elements 18 and integrated circuits 14. In a similar manner, those skilled in the art can apply various embodiments to smaller phased arrays 10A.

As a patch array, the elements 18 have a low profile. Specifically, as known by those skilled in the art, a patch antenna (i.e., the element 18 or the transmission/receiving part of the element) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field and/or receive RF signals.

As noted above and discussed in greater detail below, illustrative embodiments form the patch antennas on one or more printed circuit boards that themselves are coupled with the printed circuit board 16. These patch antennas preferably are formed using standard printed circuit board fabrication processes, thus complying with standard printed circuit board design rules (discussed below). Accordingly, using such fabrication processes, each element 18 in the phased array 10A should have a very low profile.

The phased array 10A can have one or more of any of a variety of different functional types of elements 18. For example, the phased array 10A can have transmit-only elements 18, receive-only elements 18, and/or dual mode receive and transmit elements 18 (referred to as "dual-mode elements 18"). The transmit-only elements 18 are configured to transmit outgoing signals (e.g., burst signals) only, while the receive-only elements 18 are configured to receive incoming signals only. In contrast, the dual-mode elements 18 are configured to either transmit outgoing burst signals, or receive incoming signals, depending on the mode of the phased array 10A at the time of the operation. Specifically, when using dual-mode elements 18, the phased array 10A can be in either a transmit mode, or a receive mode. The noted controller 24 at least in part controls the mode and operation of the phased array 10A, as well as other array functions.

The AESA system 10 has a plurality of the above noted integrated circuits 14 (mentioned above with regard to FIG. 2B) for controlling operation of the elements 18. Those skilled in the art often refer to these integrated circuits 14 as "beam steering integrated circuits," or "beam forming integrated circuits."

Each integrated circuit 14 preferably is configured with at least the minimum number of functions to accomplish the desired effect. Indeed, integrated circuits 14 for dual mode elements 18 are expected to have some different functionality than that of the integrated circuits 14 for the transmit-only elements 18 or receive-only elements 18. Accordingly, integrated circuits 14 for such non-dual-mode elements 18 typically have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:

phase shifting, amplitude controlling/beam weighting,

- switching between transmit mode and receive mode,
- output amplification to amplify output signals to the elements 18,
- input amplification for received RF signals (e.g., signals received from the satellite 12), and
- power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active phase shifters, and the switching functionality may be implemented using conventional transistor-based switches.

Each integrated circuit 14 preferably operates on at least one element 18 in the array. For example, one integrated circuit 14 can operate on two or four different elements 18. Of course, those skilled in the art can adjust the number of elements 18 sharing an integrated circuit 14 based upon the application. For example, a single integrated circuit 14 can control two elements 18, three elements 18, five elements 18, six elements 18, seven elements 18, eight elements 18, etc., or some range of elements 18. Sharing the integrated circuits 14 between multiple elements 18 in this manner reduces the required total number of integrated circuits 14, correspondingly sometimes enabling a reduction in the required size of the printed circuit board 16.

As noted above, the dual-mode elements 18 may operate in a transmit mode, or a receive mode. To that end, the integrated circuits 14 may generate time division diplex or duplex waveforms so that a single aperture or phased array 10A can be used for both transmitting and receiving. In a similar manner, some embodiments may eliminate a commonly included transmit/receive switch in the side arms of the integrated circuit 14. Instead, such embodiments may duplex at the element 18. This process can be performed by isolating one of the elements 18 between transmit and receive by an orthogonal feed connection.

RF interconnect, through-vias, and/or beam forming lines 26 electrically connect the integrated circuits 14 to their respective elements 18. To further minimize the feed loss, illustrative embodiments mount the integrated circuits 14 as close to their respective elements 18 as possible. Specifically, this close proximity preferably reduces RF interconnect line lengths, reducing the feed loss. To that end, each integrated circuit 14 preferably is packaged either in a flip-chipped configuration using wafer level chip scale packaging (WLCSP), or a traditional package, such as quad flat no-leads package (QFN package). While other types of packaging may suffice, WLCSP techniques are preferred to minimize real estate on the substrate 16A. Some embodiments may mount some or all of the integrated circuits 14 on or within the printed circuit boards forming the elements 18. Other embodiments may mount some or all of the integrated circuits 14 on the underlying routing substrate board 16.

In addition to reducing feed loss, using WLCSP techniques reduces the overall footprint of the integrated circuits 14, enabling them to be mounted on the top face of the printed circuit board 16 with the elements 18—providing more surface area for the elements 18. Other embodiments mount the integrated circuits 14 of one side and the elements 18 on the other side.

It should be reiterated that although FIGS. 3A and 3B show the AESA system 10 with some specificity (e.g., the layout of the elements 18 and integrated circuits 14), those skilled in the art may apply illustrative embodiments to other implementations. For example, as noted above, each integrated circuit 14 can connect to more or fewer elements 18, or the lattice configuration can be different. Accordingly, discussion of the specific configuration of the AESA system 10 of FIG. 3A (and other figures) is for convenience only and not intended to limit all embodiments.

Each dual transmit/receive integrated circuit preferably has separate transmit and receive interfaces for each element it controls. For example, if a given integrated circuit controls two elements, it has a first pair of transmit and receive interfaces for the first element, and a second pair of transmit and receive interfaces for the second element. Each transmit interface and receive interface on an integrated circuit respectively couples to corresponding transmit and receive interfaces on one of the elements. To provide signal isolation, the two interfaces on each element are polarized out of phase with each other. For example, a given element's transmit interface may be about 90 degrees out of phase with its receive interface.

Moreover, as known by those in the art, a "quad beamformer IC" has eight RF pins (typically arranged with some symmetry in the IC pin-out) and two common pins (FIG. 4). The common pins, A and B, are internally connected to the four RF pins across the interior of the IC, A, and four RF pins B, respectively. The common ports of each IC include a respective pair of "AB" pins positioned along the long edge of the IC, while the other 4 A's and 4 B's are connected to antenna elements. In a prior art phased array PCB (printed circuit board), the common pins of the like polarizations on different ICs must be connected to each other; however, connecting like-polarization commons through traditional means requires cross-overs or excessive length to combine A with A and B with B. This can present a number of problems.

To obviate those problems, FIG. 5 schematically shows an illustrative embodiments of PCB routing of a phased antenna array of 24×2 antenna elements connected to 12 beamformer ICs. FIG. 4 schematically shows the routing of the common ports of all the ICs; namely, the ICs in this embodiment are located on the top side of a PCB while the antenna elements are located on the opposing side of the PCB (FIG. 6 and noted above). In FIG. 5, each color of the traces denotes a polarization, i.e., same color, same polarization. The common pins of two adjacent ICs are connected to each other in a typical phased array, which are then connected to other adjacent pairs of ICs in a row of the array to ultimately sum up all the common ports of the same polarization signals of all the ICs into a single trace, i.e., yellow trace and blue trace for each IC row in FIG. 5. These traces bring the unique polarizations outside of the array lattice and then are connected to other devices (illustrated on the left side of FIG. 5).

For a given polarization (A or B), the common pin may be an odd number (i.e., located asymmetrically from the center of the IC). Due to this asymmetry, if two adjacent ICs are subjected to any physical rotation that are opposite from each other, the common pins of the same polarization of these adjacent ICs would be positioned asymmetrically to each other with respect to the center line running through the ICs, undesirably requiring a cross-over to combine the polarization. In FIG. 5, however, the beamformer ICs effectively are rotated generally 180 degrees relative to each other (e.g., FIG. 7 shows a zoomed in view of such rotation) and the polarization channels on the ICs are swapped in pair in layout, i.e., common A on IC #1 is connected to common Bon IC #2 and common Bon IC #1 is connected to common A on IC #2 without cross-over of the connections. This operation introduces symmetry for the IC input routing by combining mirror symmetry on PCB and rotation symmetry in the physical ICs, enabling IC input summing in a small space with design symmetry properties. The IC rotation operation enables simple routing for the common ports between two adjacent ICs, whose space gets narrower as the operation frequency range of the array is increased thereby reducing IC spacing. It should be noted that the traces generally are configured to be substantially the same length to each IC such that signals to the ICs arrive at substantially the same time and signals from the ICs combine coherently.

Due to their symmetry, the output pins topology remains the same (e.g., ABBA), but the coherent signals on A are swapped to B and vice versa. Therefore, to maintain coherent signal connection, the inputs of the antenna elements are mapped to the new symmetry (e.g., H-V-V-H V-H-H-V, FIG. 7, where H is for horizontal polarization and V is for vertical polarization) using different mixes of symmetry operations for each polarization (e.g., rotation, translation, and mirror). This operation promotes antenna polarization phase reversal between elements connected to the same ICs, but no phase reversal between adjacent elements connected to neighbor ICs. On the IC side opposite the AB common pins (RF inputs), other I/O pins can be easily routed out from the ICs without cross-over with the common pins routing.

FIG. 8 schematically shows one example of the routing within the PCB from the ICs to the antenna elements. Here, the antenna elements are shown in a split feed configuration, in which two adjacent antenna apertures in a column (i.e., the patches) are connected to each other. However, this technique is applicable to direct feed elements. As common pin A on IC #1 is connected to common pin Bon IC #2, the four RF pin A's on IC #1 are connected to the same antenna polarization at the antenna elements as the four RF pin B's on IC #2.

RF pin As on the left IC (in the green box) are connected to horizontal polarization of the antennas. In a corresponding manner, RF pin Bs on the right IC (also in the green box) are connected to the horizontal polarization of the antennas. Note that the letters on the right box/IC are upside down to demonstrate the noted effective 180 rotation. To align the antenna split feed pins to the right polarization configuration of the IC RF pins of 2 adjacent ICs, the antenna column 1 in the green box is repeated on column 4, and antenna column 2 is repeated on column 3. In this arrangement, the antenna split feed configuration of antenna column 1 and 2 becomes H-V-V-H to be connected to RF pins A-B-B-A of IC #1, while the antenna split feed configuration of antenna column 3 and 4 becomes V-H-H-V to be connected to RF pins A-B-B-A of IC #2. As a result, the common pin A on IC #1 which carries H data stream is connected correctly to the common pin Bon IC #2 which also caries H data stream.

It should be noted that although horizontal and vertical polarization is discussed and shown, various embodiments can apply to other polarizations. For example, those other polarizations may include slant, circular, or elliptical polarizations, with slight routing modifications if necessary.

The embodiments of the invention described above are intended to be merely exemplary; numerous variations and modifications will be apparent to those skilled in the art. Such variations and modifications are intended to be within the scope of the present invention as defined by any of the appended innovations.

What is claimed is:

1. A phased array system comprising:
a substrate;
a plurality of elements on the substrate;
first and second beamforming ICs on the substrate, each beamforming IC having a first and second element interface sets configured to be polarized in two different polarizations, a first common interface electrically coupled with the first set of element interfaces, and a second common interface electrically coupled with the second set of element interfaces;
a first interconnect element electrically coupling the first common interface of the first beamforming IC with the second common interface of the second beamforming IC; and
a second interconnect element electrically coupling the second common interface of the first beamforming IC with the first common interface of the second beamforming IC without the second interconnect element crossing over the first interconnect element.

2. A phased array system according to claim 1, wherein the interconnect elements electrically couple adjacent beamforming ICs on the substrate.

3. A phased array system according to claim 1, wherein the two different polarizations are horizontal and vertical polarizations.

4. A phased array system according to claim 1, wherein the first and second beamforming ICs have the same interface layouts.

5. A phased array system according to claim 1, wherein:
the first and second beamforming ICs each have at least one A-B-B-A element interface configuration with the A element interfaces electrically coupled to the first common interface of the beamforming IC as a common A interface and the B element interfaces electrically coupled to the second common interface of the beamforming IC as a common B interface;
the A interfaces of the first beamforming IC and the B interfaces of the second beamforming IC are associated with a first polarization; and
the B interfaces of the first beamforming IC and the A interfaces of the second beamforming IC are associated with a second polarization.

6. A phased array system according to claim 5, wherein the first polarization is a horizontal polarization and the second polarization is a vertical polarization.

7. A phased array system according to claim 5, wherein the first polarization is a vertical polarization and the second polarization is a horizontal polarization.

8. A phased array system according to claim 5, wherein the at least one A-B-B-A element interface configuration comprises a plurality of A-B-B-A element interface configurations.

9. A phased array system according to claim 1, wherein the second beamforming IC is rotated 180 degrees relative to the first beamforming IC so that the common interfaces of the first and second beamforming ICs face each other.

10. A phased array system according to claim 1, wherein the elements are patch antenna elements.

11. A phased array system according to claim 1, wherein the elements and the beamforming ICs are on different surfaces of the substrate.

12. A substrate comprising:
element connectors for providing RF signals to a plurality of elements supported by the substrate;
IC connectors for attaching first and second beamforming ICs to the substrate, the IC connectors including, for each beamforming IC, first and second sets of element interface connectors associated with two different polarizations, a first common interface connector associated with the first set of element interface connectors, and a second common interface connector associated with the second set of element interface connectors;

a first interconnect element electrically coupling the first common interface connector for the first beamforming IC with the second common interface connector for the second beamforming IC; and a second interconnect element electrically coupling the second common interface for the first beamforming IC with the first common interface for the second beamforming IC without the second interconnect element crossing over the first interconnect element.

13. A substrate according to claim 12, wherein the substrate is a printed circuit board.

14. A substrate according to claim 12, further comprising the plurality of elements on the substrate.

15. A substrate according to claim 14, wherein the elements are patch antenna elements formed on a surface of the substrate.

16. A substrate according to claim 12, wherein the substrate is configured for surface mounting of the beamforming ICs onto the substrate.

17. A substrate according to claim 12, wherein the interconnect elements are configured to electrically couple adjacent beamforming ICs on the substrate.

18. A substrate according to claim 12, wherein the two different polarizations are horizontal and vertical polarizations.

19. A substrate according to claim 12, wherein the IC connectors are configured such that the second beamforming IC is rotated 180 degrees relative to the first beamforming IC so that the common interfaces of the first and second beamforming ICs face each other.

20. A substrate according to claim 12, wherein the element connectors and IC connectors are on different surfaces of the substrate.

* * * * *